United States Patent Office

3,824,147
Patented July 16, 1974

3,824,147
WEATHER-RESISTANT, SAND COATED EXTERIOR GYPSUM BOARD AND WALL
James W. Baird, Arlington Heights, Ill., assignor to United States Gypsum Company, Chicago, Ill.
No Drawing. Filed May 26, 1972, Ser. No. 257,211
Int. Cl. B32b 3/26
U.S. Cl. 161—162
12 Claims

ABSTRACT OF THE DISCLOSURE

Exterior gypsum wallboard and wall assembled therefrom made weather-resistant by a coating of sand aggregate, emulsion binder, and optionally a filler or pigment.

BACKGROUND OF THE INVENTION

Gypsum board when used in exposed exterior conditions has peculiar problems which limit its use. Chief of these is the ability to resist weathering, which includes both the effect of rain, and of solid abrasion such as occurs from plants and debris rubbing or blown, respectively, against the exterior.

To overcome the weathering problem, Portland cement based coatings have been attempted, with or without aggregate. However, such attempts have been unsatisfactory due to the cement set retarding effect of soluble gypsum which is on or adjacent to the paper cover sheet of gypsum board.

Sand coatings have been developed in the past for coating interior gypsum wallboard. U.S. Pat. No. 3,507,684 discloses an example of such a coating, wherein a sand aggregate is bound by a polyvinyl acetate binder. The intent of that coating is to render still-wet interior wallboard porous for kiln drying. It has been found that polyvinyl acetate binders are generally unacceptable when applied to a formulation for dry wallboard for exterior use, unless a primer is first applied.

Still other coatings have been developed which rely on epoxy cement bases for abrasion resistance. However, the epoxies are so expensive that a need exists for a less expensive coating. Furthermore, epoxies have a limited storage capability and are difficult to apply.

SUMMARY OF THE INVENTION

The invention relates to a weather-resistant wall and the exterior gypsum board forming such a wall, rendered weather-resistant by a coating comprising a sand aggregate and between about 5 and 14% by weight of total dry solids of binder selected from the group consisting of acrylic, and styrene-butadiene, emulsions having an alkaline pH. To this may be added either or both calcium carbonate filler or titanium-dioxide pigment, each up to 10% by total dry weight of the coating. Such boards have been found suitable for use as residential and commercial-building exterior walls, the coating providing not only weatherability, but also a decorative appearance.

Accordingly, it is an object of the invention to provide a coated, weather-resistant exterior gypsum board, and a wall constructed therefrom.

A related object of the invention is to provide such a coated gypsum board wherein the coating is inexpensive and easy to apply.

It is a further object to provide such a coated gypsum board and wall in a single step, without the use of a primer.

Other objects and advantages will become apparent upon reference to the following description of the preferred embodiments.

DESCRIPTION OF THE PREFERRED EMBODIMENTS

All weight percentages hereafter expressed are of the total dry weight of the nonvolatile solids of the coating.

The invention concerns a wall, and coated exterior gypsum board comprising the wall, both being rendered weather-resistant by a coating comprising a sand aggregate, between about 5 and 14% binder selected from the group consisting of acrylic and styrene-butadiene emulsions, and optionally a calcium carbonate filler and/or titanium dioxide for hide. Color can also be added. Viscosity is preferably controlled by the addition of asbestos.

With regard to the aggregate, it preferably comprises between about 55 to 75% of the total dry weight, as outside this range, the abrasion resistance tends to drop off. The sand aggregate may be silica sand or crushed quartz, among others, as long as it is limited to 95% having a sieve size of about −14, +100 mesh. Preferably, the limits are −14, +60, with the largest fraction between −20 and +30, all mesh sizes being United States Standard. Sizes larger than −14 tend to not stick well enough while sizes below +100 require an inordinate amount of binder.

The type of acrylic emulsion does not appear to be critical, four having been tested as indicated below. However, polyvinyl acetate emulsions do not appear to be acceptable.

Dry hide can best be accomplished by the addition of calcium carbonate filler, up to 10% of the total dry weight. In some instances, it can be omitted, such as if post-painting is anticipated. Wet and dry hide can also be provided by adding up to 10% titanium dioxide. Colored pigments to give a desired tint are optional.

Viscosity is controlled, as is conventional, by the addition of asbestos fibers. In the coating of the invention, the asbestos comprises preferably between about 2 to about 6% of the total dry weight. Viscosity is further controlled by adding sufficient water during mixing to bring the viscosity to about 250–330 Brabenders, as measured on a VC-3 Type Brabender using a 5/16 inch flag paddle.

The total preferably ready-mixed, coating is then applied in a single coating step to conventional exterior gypsum board of any convenient thickness. Such board conventionally comprises a hydrated gypsum core with a conventional asphalt emulsion additive, and an unprimed paper cover sheet adhered to at least one side thereof, the coating being applied to the cover sheet to form a decorative, weather-resistant wall surface. Preferably, the method of application is spray, using conventional equipment, although manual application can also be used. Whatever the method, preferably between about 0.16 and 0.19 pounds of dry coating per square feet of board are applied to achieve the desired weatherability. More, of course, can be applied but the increase in weatherability obtained thereby is not proportional to the increase in coating.

The gypsum board is preferably preassembled prior to coating into an exterior wall by conventional means such as mechanical or adhesive fastening of the board to wood or metal studs. Joint treatment should utilize a compound of the type taught in U.S. Pat. No. 3,297,601, which teaching is expressly incorporated herein. Or, such a wall can be first coated as described above and thereafter assembled, spot coating being applied to nailheads or other surface breaks. In either case, a finished wall is provided having a decorative, weather-resistant surface. The surface will withstand both rain and abrasion.

A representative Formula A found to be particularly suitable as the coating described above is as follows:

TABLE 1.—FORMULA A

| Ingredient: | Percent weight |
|---|---|
| Sand aggregate, sized mesh −14 +60 | 66.00 |
| Acrylic emulsion binder "Rhoplex AC-35" by Rohm and Haas Co., 47% solids | 14.00 |
| Calcium carbonate filler | 8.32 |
| Asbestos fibers | 4.00 |
| Rutile grade $TiO_2$ | 2.00 |
| Thickeners and preservatives | 1.15 |
| Surface active agents | 1.73 |
| Ethylene glycol | 3.00 |

Test Procedure

The American Plywood Association has developed an Architectural Qualified Coatings Program for testing exterior coatings. The above Formula A was prepared and applied to 3/8 inch exterior type plywood cut twelve inches by twelve inches. Four such samples were prepared with no edge or back sealing, and given accelerated aging tests including soak-dry, boil-dry, hot water-dry, and freeze-thaw. Except for the freeze-thaw test, each test was given 25 cycles. The freeze-thaw cycle was repeated ten times. Adhesion and resistance to degradation was checked, and it was found that Formula A passed the test. In contrast, a Formula B set forth immediately hereafter and involving vinyl acetate co- and ter-polymers, failed.

TABLE 2.—FORMULA B

| Ingredient: | Gms. per Gallon |
|---|---|
| Vinyl acetate terpolymer (Resyn 1234 manufactured by National Starch) | 2000 |
| Water | 180 |
| Ethylene Glycol | 40 |
| Titanium dioxide | 140 |
| Plaster grade perlite | 400 |
| Vinyl acetate copolymer (Resyn 1251 by National Starch) | 960 |
| Asbestos fibers | 120 |
| Various additives | 52 |

Although polyvinyl acetate emulsions were not found to be acceptable, other emulsions set forth in Table 3 below in addition to "Rhoplex A-35" have been found to be acceptable when the total solids thereof are added to form 14% by weight of the coating.

TABLE 3.—ACCEPTABLE EMULSION

| Emulsion brand name | Manufacturer | Generic | Percent solids as supplied |
|---|---|---|---|
| "Rhoplex AC-22" | Rohm & Haas Co. | Acrylic | 44 to 45 |
| "Rhoplex AC-61" | do | do | 47 |
| "Rhoplex AC-388" | do | do | 47 |
| "Dow Latex 460" | Dow Chemical Co. | Styrene-butadiene | 50 |

The properties of the acceptable emulsions are further set forth in Table 4.

of the total coating weight has produced acceptable results.

Although the invention has been described in connection with certain preferred embodiments, it is not intended that it be limited thereto. Rather, it is intended that it cover all alternative arrangements, equivalents, and embodiments as may be included within the scope of the following claims.

What is claimed is:

1. An abrasion-resistant, coated gypsum board for exterior use, comprising a hydrated gypsum core, a paper cover sheet adhered to at least one side of the core, and a coating over said sheet, said coating comprising between about 55 to about 75% sand aggregate, and about 5 to 14% emulsion binder selected from the group consisting of acrylic and styrene-butadiene emulsions having an alkaline pH, said percentages being by dry weight of the total nonvolatile solids of the coating.

2. The coated gypsum board as defined in Claim 1, wherein said sand aggregate consists essentially of sand having sizes between about −14 and +100 U.S. Standard mesh.

3. The coated gypsum board as defined in Claim 1, and further including a calcium carbonate filler present in an amount up to about 10% of the total dry weight of the coating.

4. The coated gypsum board as defined in Claim 1, and further including asbestos in an amount sufficient to give said coating, when ready-mixed with water, a sprayable viscosity.

5. The coated gypsum board as defined in Claim 4, wherein said asbestos comprises between about 2 to 6% of the total dry weight of the coating.

6. The coated gypsum board as defined in Claim 1, wherein said coating is applied to the board in an amount between about 0.16 and 0.19 lbs. of dry coating per square feet of board.

7. An exterior wall comprising a plurality of the coated gypsum boards as defined in Claim 1, and means for mounting them exposed to the elements, whereby said coating provides weatherability to the boards and therefore to the wall.

8. The coated gypsum board as defined in Claim 1, wherein said paper cover sheet is unprimed.

9. An abrasion-resistant, coated gypsum board for exterior use, comprising a hydrated gypsum core, a paper cover sheet adhered to at least one side of the core, and a coating on the sheet consisting essentially of between about 55 to 75% sand aggregate, between about 5 to 14% emulsion binder selected from the group consisting of acrylic and styrene-butadiene emusions having an alkaline pH and between about 2 to 6% asbestos fibers, said percentages being by dry weight of the total nonvolatile solids of the coating, said coating being applied in an amount between about 0.16 and 0.19 pounds of dry coating per square feet of board.

10. The coated gypsum board as defined in Claim 9,

TABLE 4

| Property | AC-388 | AC-22 | AC-35 | AC-61 | Dow Latex 460 |
|---|---|---|---|---|---|
| Solids content | 50.0±0.5% | 44 to 45% | 46 to 47% | 46 to 47% | 48%. |
| pH | 9.0 to 10.0 | 9.5 to 10.0 | 9.0 to 10.0 | 9.5 | 10.5. |
| Weight per gallon | 8.8 lbs | 8.8 to 8.9 lb | 8.8 lbs | 8.9 lbs | 8.4 lbs. |
| Bulking value of dry solids | 0.107 gallon/lb | 0.1035 gal./lb | 0.107 gal./lb | 0.106 gal./lb | Not available. |
| Minimum film-formation temperature. | 8°±2° C | 7° to 9° C | 7°±2° C | 18° C | Do. |
| Specific gravity of solids | Not available | 1.15 to 1.16 | Not available | 1.13 | 1.03. |
| Preservative | 56 p.p.m. of a 21% solution of di(phenyl-mercury) dodecenyl succinate. | Not available | do | Not available | Not available. |
| Initial viscosity | Not available | do | do | 65 (Krebs units) | Do. |
| Particle size range | | | | | 2,000 angstroms (0.2 microns). |
| | From about 0.1 to about 0.7 microns | | | | |

Still another variation in the invention which produces acceptable weather resistance is the reduction of the weight percentage amount to the emulsion. That is, reduction of acrylic emulsions so as to constitute only 5% and further including a calcium carbonate filler present in an amount up to about 10% of the total dry weight of the coating.

11. An exterior wall comprising a plurality of the coated gypsum boards as defined in Claim 9, and means for mounting them exposed to the elements, whereby said coating provides weatherability to the boards and therefore to the wall.

12. The coated gypsum board as defined in Claim 9, and further including titanium dioxide present in an amount up to about 10% of the total dry weight of the coating.

References Cited

UNITED STATES PATENTS

| | | | |
|---|---|---|---|
| 3,507,684 | 4/1970 | Wallen | 156—46 X |
| 3,558,413 | 1/1971 | Porter et al. | 161—162 |
| 3,630,817 | 12/1971 | Winkowski | 156—41 X |
| 3,389,042 | 6/1968 | Bieri et al. | 156—44 X |
| 3,300,371 | 1/1967 | Hart | 156—44 X |
| 3,694,298 | 9/1972 | Veschuroff et al. | 156—44 X |

FOREIGN PATENTS 660,141  19/1951  Great Britain.

WILLIAM J. VAN BALEN, Primary Examiner

U.S. Cl. X.R.

117—155 R, 155 UA; 156—45; 161—164, 209, 249

UNITED STATES PATENT OFFICE
CERTIFICATE OF CORRECTION

Patent No. 3,824,147     Dated July 16, 1974

Inventor(s) James W. Baird

It is certified that error appears in the above-identified patent and that said Letters Patent are hereby corrected as shown below:

Column 4, line 53, after "pH", insert a comma -- , --.

Signed and sealed this 5th day of November 1974.

(SEAL)
Attest:

McCOY M. GIBSON JR.
Attesting Officer

C. MARSHALL DANN
Commissioner of Patents